(12) United States Patent
Garlick et al.

(10) Patent No.: US 7,577,762 B1
(45) Date of Patent: Aug. 18, 2009

(54) COOPERATIVE SCHEDULING FOR MULTIPLE CONSUMERS

(75) Inventors: Lincoln G. Garlick, Santa Clara, CA (US); Scott R. Whitman, Saratoga, CA (US); Stephen D. Lew, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 513 days.

(21) Appl. No.: 11/048,386

(22) Filed: Feb. 1, 2005

(51) Int. Cl.
*G06F 3/00* (2006.01)
(52) U.S. Cl. .......................................... 710/6; 345/505
(58) Field of Classification Search .............. 710/6, 710/59; 345/505
See application file for complete search history.

(56) References Cited

U.S. PATENT DOCUMENTS

| | | | | |
|---|---|---|---|---|
| 5,754,801 A * | 5/1998 | Lambrecht et al. | .......... | 710/309 |
| 5,822,578 A * | 10/1998 | Frank et al. | .................. | 712/244 |
| 5,870,622 A * | 2/1999 | Gulick et al. | .................. | 712/35 |
| 6,049,841 A * | 4/2000 | Fields et al. | .................. | 710/28 |
| 6,570,571 B1 * | 5/2003 | Morozumi | .................. | 345/505 |
| 6,671,795 B1 * | 12/2003 | Marr et al. | .................. | 712/220 |
| 2002/0108003 A1 * | 8/2002 | Ellis et al. | ...................... | 710/39 |
| 2005/0068325 A1 * | 3/2005 | Lefebvre et al. | ............ | 345/522 |

* cited by examiner

*Primary Examiner*—Henry W. H. Tsai
*Assistant Examiner*—Elias Mamo
(74) *Attorney, Agent, or Firm*—Patterson & Sheridan, LLP (57) ABSTRACT

A system and method schedules command streams for processing by a variety of consumers. A single command stream is parsed and commands included in the command stream are output to one of the variety of consumers at a time. A preemptive scheduling mechanism is used so that a first consumer may yield to a second consumer when the first consumer has received a sufficient amount of commands. The pre-emptive scheduling enables several of the consumers to process commands concurrently. The pre-emptive scheduling mechanism may be implemented by a device driver inserting yield commands into the command stream or by a unit parsing the command stream.

20 Claims, 10 Drawing Sheets

COOPERATIVE SCHEDULING FOR MULTIPLE CONSUMERS

BACKGROUND OF THE INVENTION

1. Field of the Invention

Embodiments of the present invention generally relate to scheduling command stream processing, and more particularly to distributing commands to a variety of consumers.

2. Description of the Related Art

Conventional command stream scheduling allocates a specific amount of time, a time slice, to each consumer during which the consumer receives commands from a command stream scheduler. When the time slice for a consumer expires, the command stream scheduler switches contexts, thereby selecting another command stream and outputs the other command stream to another consumer. When this time sharing scheme is used, the amount of processing represented by the commands a consumer receives may cause processing inefficiencies.

For example, a first consumer may receive a small number of commands that initiate many cycles of processing. During the processing cycles, the first consumer cannot accept additional commands. The scheduler must then wait for either the first consumer to begin accepting commands or for the time slice to expire. In contrast, a second consumer may receive several commands during a time slice, but not receive a command which initiates processing. Therefore, the second consumer remains idle until a subsequent time slice when the second consumer receives a command to initiate processing. Although the time slice allocation scheme may be "fair" it may not be well matched to the processing characteristics of each consumer. Therefore, some consumers may be idle while other consumers are overwhelmed, limiting processing concurrency.

Accordingly, there is a need to schedule command stream processing to achieve greater processing concurrency and improve overall command stream throughput.

SUMMARY OF THE INVENTION

The current invention involves new systems and methods for scheduling command streams for processing by a variety of consumers. A single command stream is parsed and commands included in the command stream are expanded and output to one of the variety of consumers at a time. A pre-emptive scheduling mechanism is used so that a first consumer may yield to a second consumer when the first consumer has received a sufficient workload. The pre-emptive scheduling enables several of the consumers to process commands concurrently and may improve overall command stream throughput. The pre-emptive scheduling mechanism may be implemented by a device driver inserting yield commands into the command stream or by a unit inferring yield commands while parsing the command stream.

Various embodiments of the invention include a system for switching between multiple command stream channels. The system includes a first consumer, a second consumer, and a command stream unit. The first consumer is configured to process commands of at least a first type. The second consumer is configured to process commands of at least a second type. The command stream unit is configured to select a first channel and switch from processing the first channel to processing a second channel. The first channel and the second channel are selected from the multiple command stream channels. Processing is switched from the first channel to the second channel when a yield command is processed for the first channel.

Various embodiments of a method of the invention for scheduling processing of command streams. The method includes determining a consumer type associated with a first command stream, identifying an execution command within the first command stream, and inserting a yield command in the first command stream to cause parsing of the first command stream for output of one or more commands to a first consumer corresponding to the consumer type to stop and parsing of a second command stream for output of one or more commands to a second consumer to begin.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
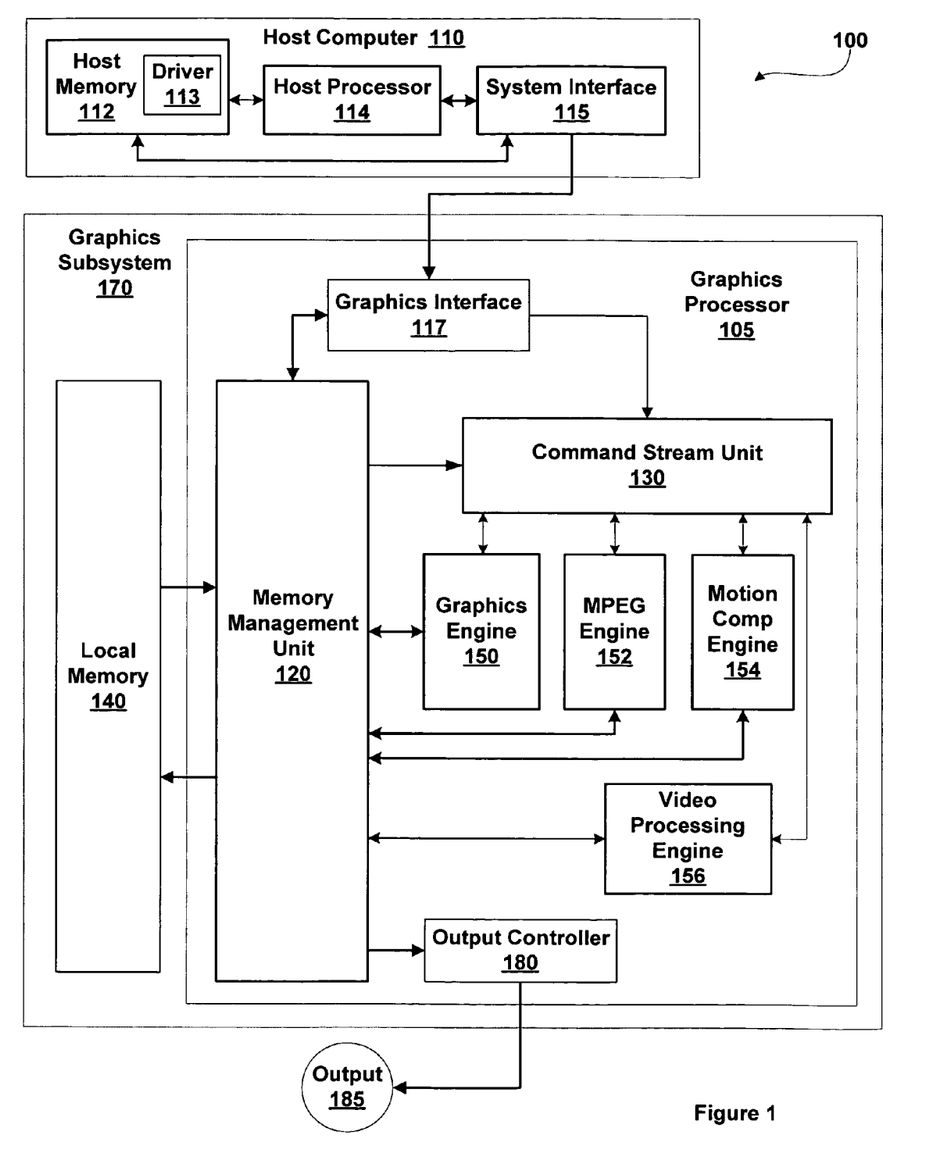
FIG. 1 is a block diagram of a graphics processing system in accordance with one or more aspects of the present invention.

FIG. 1 is an illustration of a computing system generally designated 100 and including a host computer 110 and a graphics subsystem 170. Computing system 100 may be a desktop computer, server, laptop computer, palm-sized computer, tablet computer, game console, portable wireless terminal such as a personal digital assistant (PDA) or cellular telephone, computer based simulator, or the like. Host computer 110 includes a host processor 114 that may include a system memory controller to interface directly to a host memory 112 or may communicate with host memory 112 through a system interface 115. System interface 115 may be an I/O (input/output) interface or a bridge device including the system memory controller to interface directly to host memory 112. An example of system interface 115 known in the art includes Intel® Northbridge.

A graphics device driver, driver 113, interfaces between processes executed by host processor 114, such as application programs, and graphics processor 105, translating program instructions as needed for execution by graphics processor 105. Driver 113 also uses commands to configure sub-units within graphics processor 105. Host computer 110 communicates with graphics subsystem 170 via system interface 115 and a graphics interface 117 within a graphics processor 105. Data, program instructions, and commands received at graphics interface 117 can be passed to a command stream unit 130 or written to a local memory 140 through memory management unit 120.

Command stream unit 130 reads command streams from local memory 140 via memory management unit 120, parses and expands the command streams, and outputs expanded commands to a variety of consumers, including a graphics engine 150, an MPEG (motion picture experts group) engine 152, a motion comp (compensation) engine 154, and a video processing engine 156. Each consumer also interfaces with memory management unit 120 to read data and program instructions from and to write data to memory that is accessible via memory management unit 120. In some embodiments of the present invention additional consumers are coupled to command stream unit 130 and memory management unit 120.

Graphics engine 150, MPEG engine 152, motion comp engine 154, and video processing engine 156 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, filtering, scaling, format conversion, and the like. In a typical implementation graphics engine 150 performs geometry computations, rasterization, and fragment computations, operating on surface, primitive, vertex, fragment, pixel, sample or any other data. In typical implementation MPEG engine 152 performs MPEG decoding of frames of image data. Likewise, motion comp engine 154 performs motion compensation operations known to those skilled in the art. Video processing engine 156 processes image data for display, performing operations such as compositing, format conversion, scaling, filtering, and the like. The engines are typically pipelined and can therefore perform several operations in parallel, processing data for two or more command streams at any time.

When the data, program instructions, and commands received by graphics subsystem 170 have been completely processed by graphics processor 105, an output 185 of graphics subsystem 170 is provided using an output controller 180. Output controller 180 is optionally configured to deliver processed data to a display device, network, electronic control system, other computing system such as computing system 100, other graphics subsystem 170, or the like. Alternatively, the processed data is output to a film recording device or written to a peripheral device, e.g., disk drive, tape, compact disk, or the like.

Figure 2A:
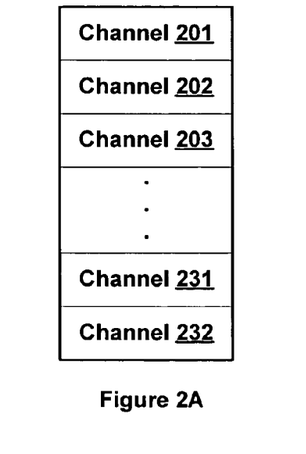
FIG. 2A is a conceptual diagram of several channels in accordance with one or more aspects of the present invention.

FIG. 2A is a conceptual diagram of several channels in accordance with one or more aspects of the present invention. Each channel includes a sequence of commands, described in conjunction with FIG. 3A, that configure a consumer to perform specific operations. In addition to the commands, each consumer reads program instructions and data via memory management unit 120 and the data is processed according to the program instructions to produce processed data. A single application program may communicate with driver 113 to produce one or more channels. Each channel may be stored in local memory 140, host memory 112, or in a memory resource, e.g., cache, or the like, within graphics processor 105.

Some channels, such as channel 201 and 202, include commands for a single consumer, such as graphics engine 150, MPEG engine 152, motion comp engine 154, video processing engine 156, or the like. Other channels, such as channel 203, include commands for two or more consumers. Several channels may be processed concurrently, each by a different consumer or serially by a single pipelined consumer. The commands within each channel are processed in order to maintain data coherency and only one consumer may process a particular command stream at a time. For example, a first group of commands within a channel may generate processed data which is further processed by a second group of commands within the same channel. When a channel includes commands for multiple consumers, i.e., a multi-consumer channel, the first group of commands and the second group of commands may be processed by different consumers, and the processed data may be written to memory by one of the multiple consumers and read from memory by another one of the multiple consumers. Execution of the multi-consumer channel commands is not performed concurrently by two or more consumers in order to maintain processed data coherency.

Figure 2B:
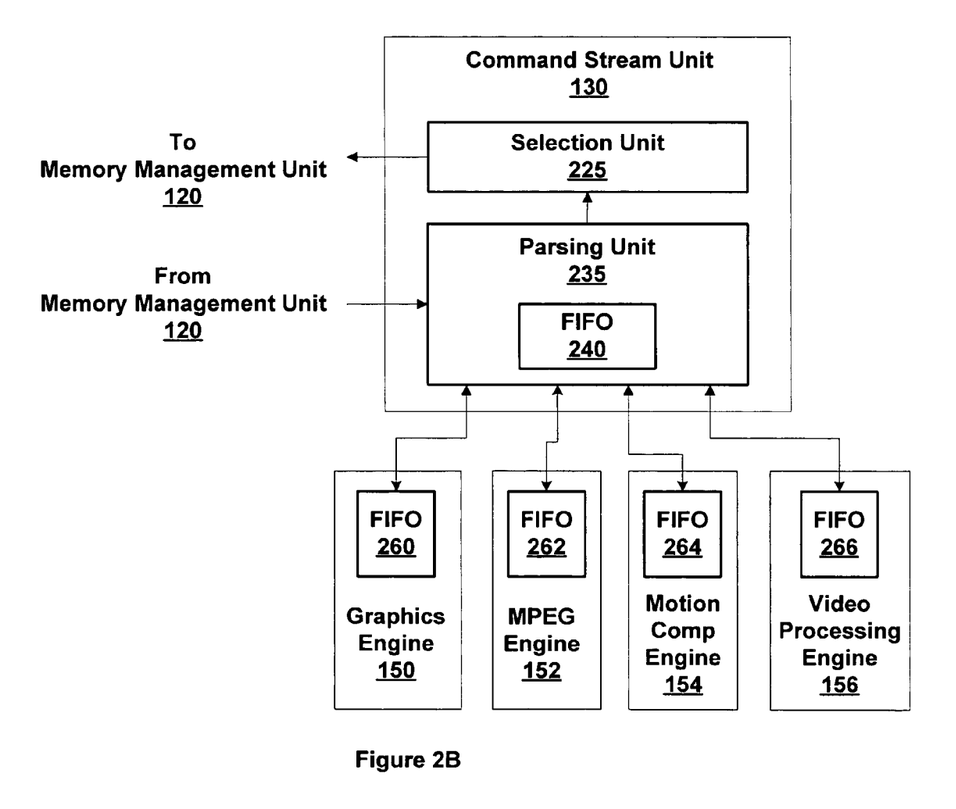
FIG. 2B is a block diagram of a portion of the graphics processor shown in FIG. 1 in accordance with one or more aspects of the present invention.

FIG. 2B is a block diagram of a portion of graphics processor 105 shown in FIG. 1 in accordance with one or more aspects of the present invention. A selection unit 225 within command stream unit 130 selects a channel for processing. Specifically, selection unit 225 outputs a read request to memory management unit 120 specifying which group of commands to read from the selected channel. In some embodiments of the present invention, a runlist is provided which specifies an order for selecting the channel for processing. The runlist may be generated by driver 113 and stored within command stream unit 130. In other embodiments of the present invention, selection unit 225 processes the channels in the order they are stored in memory, returning to the first channel once the last channel has been processed. In conventional systems, each channel is processed for a predetermined number of clock cycles or a predetermined number of commands are read from each channel before selection unit 225 selects another channel for processing. Various methods that may be used by selection unit 225 to determine when to switch channels are described in conjunction with FIGS. 4A, 6A, 6C, and 7B.

When graphics processor 105 is implemented as an integrated circuit, sharing selection unit 225 and parsing unit 235 between multiple consumers may use less die area compared with using a separate command stream unit, such as command stream unit 130, for each consumer. Furthermore, multi-consumer channel data dependencies, i.e., coherence, may be maintained when a single command stream unit, such as command stream unit 130, controls the output of expanded commands to each consumer targeted by the multi-consumer channel. Techniques known to those skilled in the art, such as semaphores, may be used as needed to control timing of the output of expanded commands from different channels to one or more consumers. In some embodiments of the present invention, two or more command stream units 130 may be used, as desired, to output expanded commands to one or more consumers.

Commands included in the channel read by selection unit 225 are returned from memory management unit 120 to a parsing unit 235. Parsing unit 235 parses the group of commands and determines which consumer each command targets, i.e. determines a type associated with the group of commands. Parsing unit 235 then determines whether any consumer matching the type of a first command in the group is available to accept commands. A consumer is available when it is not "yielding" its time slice to another consumer, as described further herein. When all consumers matching the type of the first command are yielding, selection unit 225 selects another channel for processing. When a consumer matching the type of the first command is not yielding, parsing unit 235 processes the command and produces one or more expanded commands. Parsing unit 235 includes a FIFO (first-in first-out memory) 240 which is used to queue expanded commands for output to the consumers. In some embodiments of the present invention, FIFO 240 is omitted and the expanded commands are output by parsing unit 235 directly to each consumer.

Each consumer may include a command FIFO, such as FIFO 260, 262, and 265 to buffer a number of commands received from parsing unit 235. Each FIFO is sized as needed to store a number of commands to provide the consumer with a sufficient workload to process while other consumers receive commands from parsing unit 235. For example, FIFO 262 may be sized to store commands for programming MPEG engine 152 to decode an entire frame. Therefore, when FIFO 262 is filled MPEG engine 152 will be busy processing data for several cycles, during which time it will not need additional commands. In some embodiments of the present invention, a FIFO may be omitted for any particular consumer. Similarly, one or more command FIFOs may be included within parsing unit 235 to buffer commands received from memory management unit 120 or to buffer commands for output to graphics engine 150, MPEG engine 152, motion comp engine 154, or video processing engine 156.

Figure 3A:
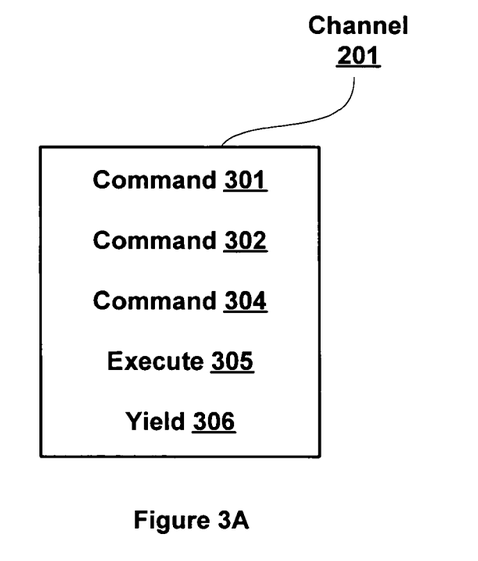
FIG. 3A is a conceptual diagram of commands within a channel in accordance with one or more aspects of the present invention.

FIG. 3A is a conceptual diagram of commands within channel 201 in accordance with one or more aspects of the present invention. Commands 301, 302, and 304 include configuration information for a specific consumer. An execute command, such as execute 305 initiates processing of data by the specific consumer. A yield command, such as yield 306 is processed by parsing unit 235 and is not output to the specific consumer. In one embodiment of the present invention, yield commands are inserted by driver 113 based on characteristics of the specific consumer. For example, characteristics may include a number of commands that may be buffered by the specific consumer or the number of pipeline stages included within the specific consumer. When yield 306 is encountered in a command stream, command stream unit 130 switches from parsing channel 201 to parsing another channel, and the specific consumer proceeds to process execute 305. The specific consumer yields any remaining time in its time slice to another consumer, thereby improving command stream processing concurrency and overall command stream throughput.

Figure 3B:
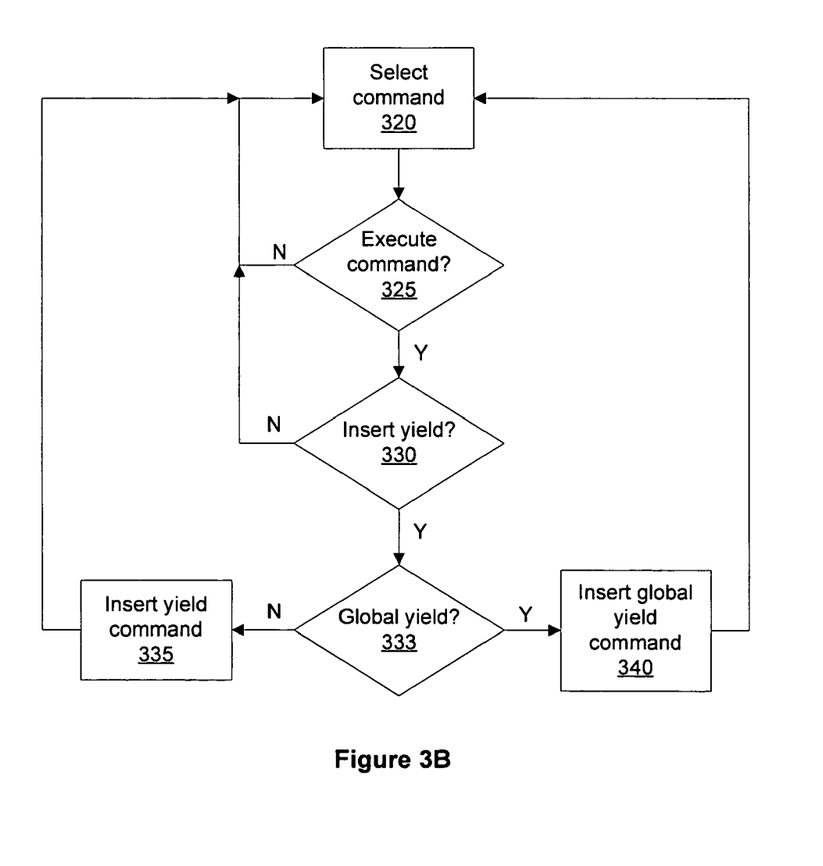
FIG. 3B illustrates an embodiment of a method of inserting yield commands in a command stream in accordance with one or more aspects of the present invention.

FIG. 3B illustrates an embodiment of a method of inserting yield commands in a command stream in accordance with one or more aspects of the present invention. In step 320, driver 113 selects a command based on a process executed by host processor 114, e.g., an application program. In step 325, driver 113 determines if the command selected in step 320 is an execute command, and, if not, driver 113 returns to step 320 and selects the next command in the command stream. If, in step 325 driver 113 determines the command selected in step 320 is an execute command, then in step 330 driver 113 determines if a yield command should be inserted in the command stream. Each consumer is allocated a time slice during which to receive commands. The specific time slice duration may be programmable for each consumer. Alternatively, each channel is allocated a time slice which may be programmable. When a yield command is received by parsing unit 235 the time slice is terminated early and selection unit 225 selects a different channel for processing. Although parsing of the command stream ceases, any expanded command in FIFO 240 may be output to and executed by a consumer. Therefore, each yield command causes command stream unit 130 to perform a context switch, switching processing from one command stream to another command stream.

Determination of whether or not to insert a yield command may differ for each embodiment of the present invention and may be programmable. The determination may be based on a specific characteristic of the target consumer of the execute command. For example, driver 113 may be configured to insert a yield command for every two execute commands targeting MPEG engine 152 because MPEG engine 152 processes data after receiving one execute command and buffers data for another execute command in FIFO 262. A sufficient workload for MPEG engine 152 may therefore be represented by two execute commands. In another example, driver 113 may be configured to insert a yield for each execute command directed to graphics engine 150 because graphics engine 150 requires many clock cycles to process data after receiving each execute command. A sufficient workload for graphics engine 150 may therefore be represented by a single execute command. In still another example, driver 113 may be configured to insert a yield for various numbers of execute commands depending on the mode graphics engine 150 is configured to operate in.

If, in step 330 driver 113 determines that a yield command should be inserted, then in step 333 driver 113 determines if the yield command should be a "global" yield commend. A global yield command causes the target consumer to yield not only the time remaining in the current time slice, but to yield all time slices until a yield state information is updated to indicate the target consumer may receive commands. The yield state information may be updated when the target consumer becomes idle, as described in conjunction with FIG.

4B, thereby permitting the target consumer to receive commands. If, in step 330 driver 113 determines that a yield command should not be inserted, then driver 113 returns to step 320.

If, in step 333 driver 113 determines the yield command should not be a global yield command, then in step 335 driver 113 inserts a yield command in the command stream directly after the execute command. For example, in channel 201, yield command, yield 306 is inserted by driver 113 directly after execute commands, execute 305. If, in step 333 driver 113 determines that the yield command should be a global yield command, then in step 340 driver 113 inserts a global yield command in the command stream directly after the execute command and returns to step 320. A global yield command may be a yield command with a bit set that causes the yield state information for the target consumer to be updated indicating the target consumer is yielding to any other consumer. In some embodiments of the present invention, yield state information is maintained for each consumer type rather than for each consumer.

Figure 3C:
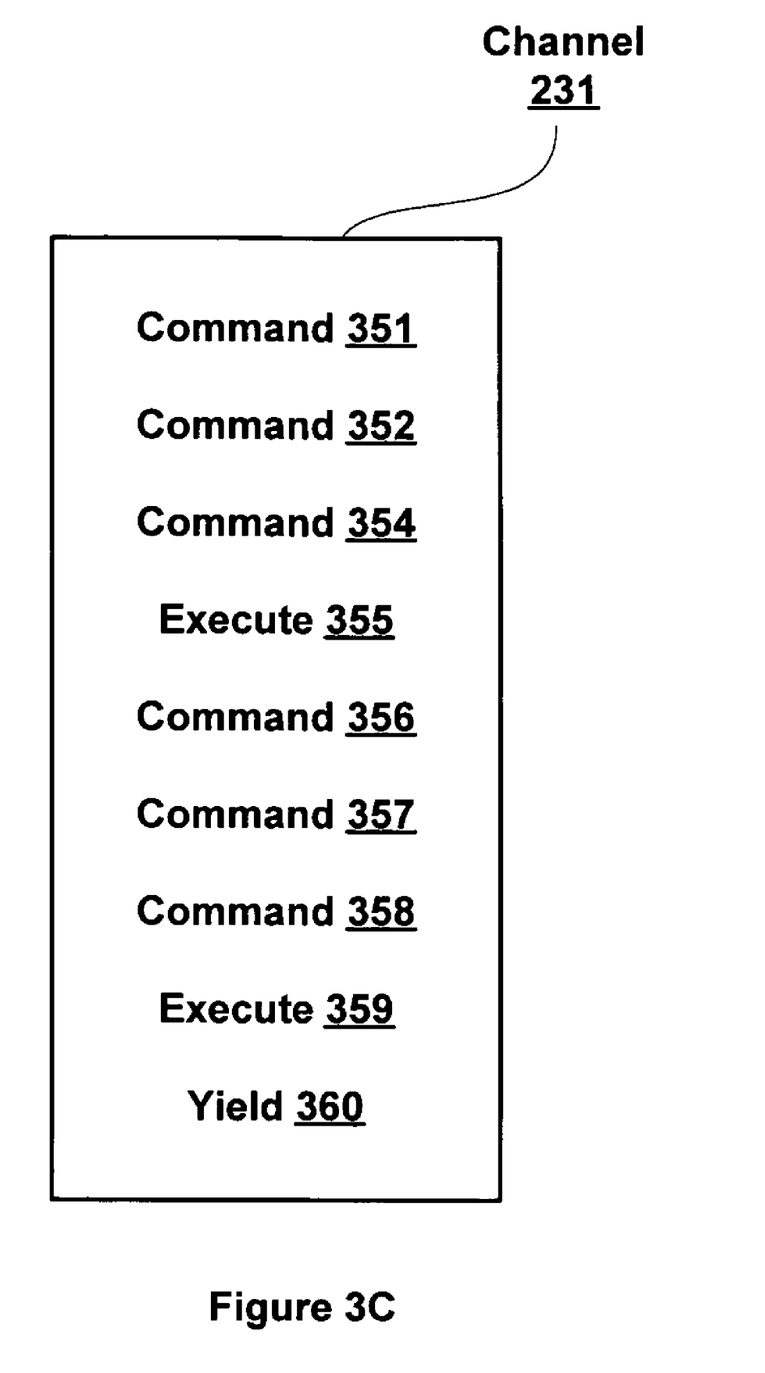
FIG. 3C is a conceptual diagram of commands within another channel in accordance with one or more aspects of the present invention.

FIG. 3C is a conceptual diagram of commands within channel 231 in accordance with one or more aspects of the present invention. In one embodiment of the present invention, driver 113 may be configured to insert a yield command when a sufficient workload is available for an engine. For example when commands 351, 352, 354, 356, 357, 358 and execute commands 355 and 359 target MPEG engine 152 a yield command, specifically yield 360 is inserted by driver 113 for every two execute commands (execute 355 and 359). Yield 360 may be a global yield command. In other embodiments of the present invention, driver 113 may be configured to insert a yield for various numbers of execute commands depending on which engine is targeted or depending on the mode a targeted engine is configured to operate in.

In another example, commands 351, 352, 354, and execute command 355 target a first engine and commands 356, 357, 358 and execute command 359 target a second engine. In this example driver 113 is configured to output two or more execute commands targeting the first engine before inserting a yield command. In this example driver 113 is also configured to insert a yield command 360 following execute command 359 that is directed to the second engine, because the second engine requires many clock cycles to process data after receiving each execute command.

Driver 113 is configured to insert yield commands in each command stream to increase command processing concurrency between several consumers. Specifically, driver 113 inserts yields following a sequence of commands which provide a particular consumer with a sufficient workload. When a yield command is encountered in a command stream, command stream unit 130 switches to a different channel, as described in conjunction with FIG. 4A. Each target consumer yields any remaining time in its time slice to another consumer, thereby improving command stream processing concurrency and overall command stream throughput. When a yield command is not used it is more likely that a consumer will receive more than a sufficient workload, and the consumer may then refuse to accept additional commands, thereby backing up command stream processing. Command stream unit 130 then stalls parsing of the channel until the consumer accepts additional commands. FIFOs such as FIFO 240, 260, 262, 264, and 266 may be used to buffer commands to reduce stalling of command stream processing. However, using a combination of yield commands and FIFOs may improve processing concurrency between the consumers while reducing stalls of command stream processing.

Figure 4A:
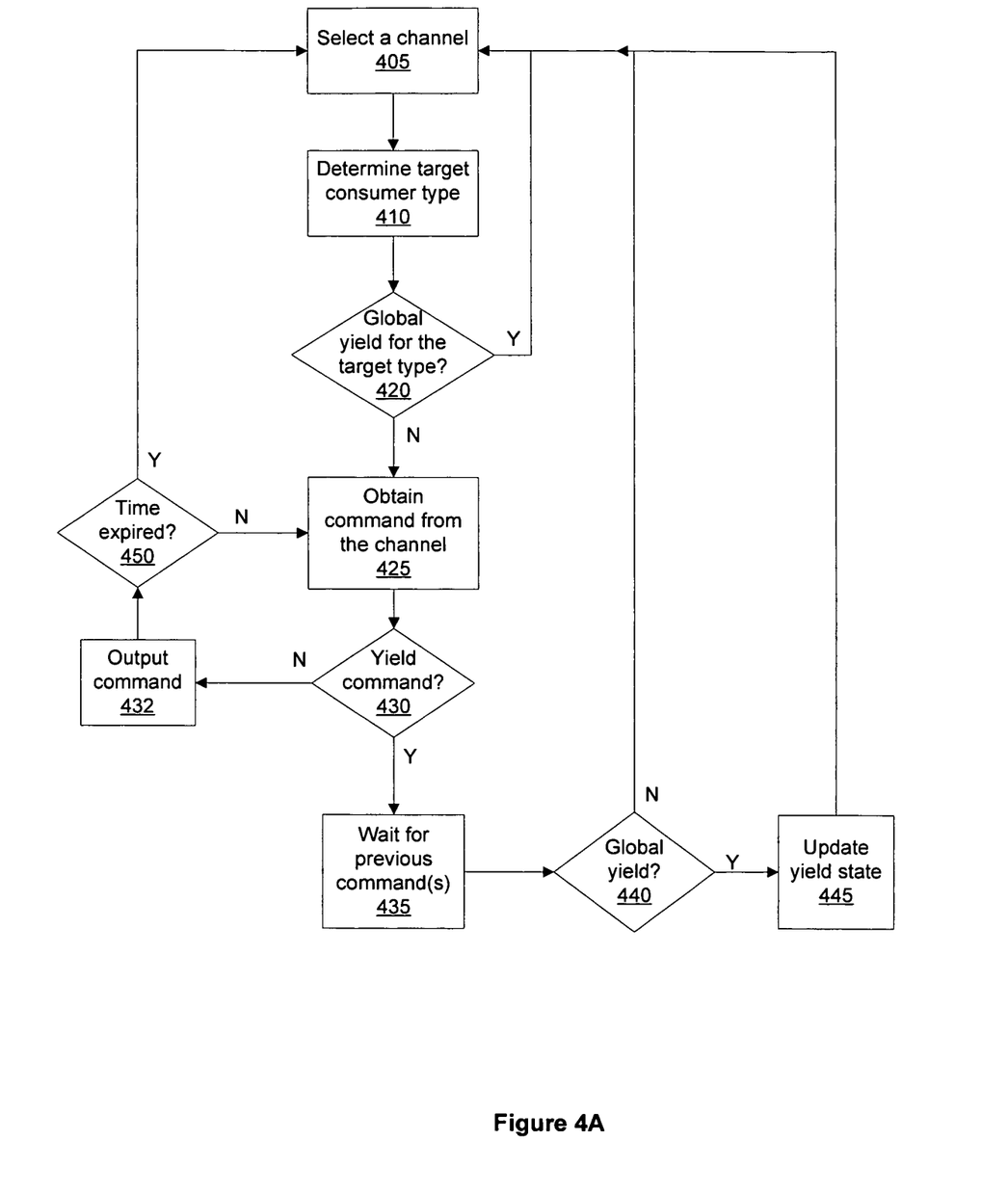
FIG. 4A illustrates an embodiment of a method of cooperatively scheduling commands for multiple consumers in accordance with one or more aspects of the present invention.
Figure 4B:
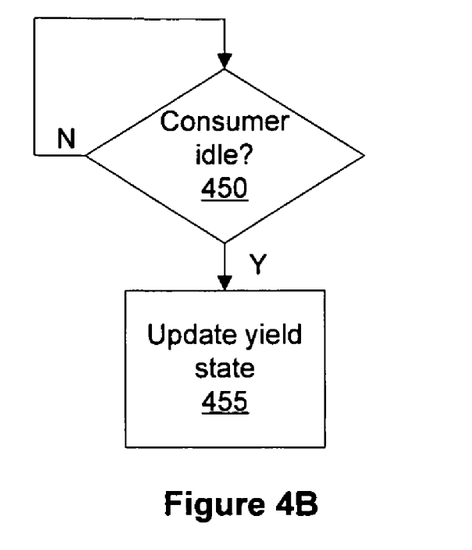
FIGS. 4B and 4C illustrate embodiments of methods of clearing a yield signal in accordance with one or more aspects of the present invention.

FIG. 4A illustrates an embodiment of a method of cooperatively scheduling commands for multiple consumers in accordance with one or more aspects of the present invention. In step 405, selection unit 225 selects a channel for processing and outputs a read request to read a group of commands for the selected channel. In step 410, parsing unit 235 determines the target consumer type associated with a first command in the group of commands received as a result of the read request. In step 420 parsing unit 235 determines if any consumer matching the target type determined in step 410 is available to accept commands, i.e., if a consumer matching the type is not yielding.

If, in step 420 parsing unit 235 determines the yield state information of all consumers of the target type indicate that the consumers of the type are yielding, then parsing unit 235 does not process any commands from the channel and selection unit 225 returns to step 405 and selects a different channel. If, in step 420 parsing unit 235 determines a consumer of the type is not yielding, then in step 425 parsing unit 235 obtains a command from the channel. In step 430, parsing unit 235 determines if the command is a yield command, and, if not, in step 432 parsing unit 235 expands and outputs the command. If parsing unit 235 includes FIFO 240, then in step 432 parsing unit 235 queues the expanded command for output to the target consumer by pushing it onto FIFO 240.

In step 450 parsing unit 235 determines if the time slice allocated to process the channel has expired. If, in step 450, parsing unit 235 determines the time slice has expired, then parsing unit 235 does not process the command and selection unit 225 selects a different channel in step 405. If, in step 450, parsing unit 235 determines the time slice has not expired, then parsing unit 235 returns to step 425 to obtain the next command from the channel.

If, in step 430 parsing unit 235 determines the command is a yield command, then in step 435 parsing unit 235 waits for any previous commands queued for output to the target consumer to be output to the target consumer. Yield commands are executed by parsing unit 235, but are not output to the target consumer. In embodiments of the present invention in which parsing unit 235 outputs commands directly to the target consumer, without any buffering, step 435 may be omitted. In step 440 parsing unit 235 determines if the yield command is a global yield command, and, if not, parsing unit 235 does not process the next command and selection unit 225 selects a different channel in step 405. If, in step 440 parsing unit 235 determines the yield command is a global yield command, then in step 445 parsing unit 235 updates the yield state information for the target consumer and selection unit 225 selects a different channel in step 405. The yield state information is updated to indicate that the target consumer is yielding. Specifically, in step 445, parsing unit 235 may set a global yield flag corresponding to the target consumer to update the yield state information. In some embodiments of the present invention, command stream unit 130 may be configured to disable global yielding and consumers only yield time remaining in the time slice rather than yielding any future time slices.

FIG. 4B illustrates an embodiment of a method of updating the yield state information in accordance with one or more aspects of the present invention. In step 450 parsing unit 235 determines if any consumer is idle, and, if so, then in step 455 parsing unit updates the yield state information corresponding to the idle engine(s) to indicate that the engine(s) are idle. The yield state information is updated to indicate that any idle consumers are not yielding and are therefore available to receive commands. If, in step 450 parsing unit 235 determines that no consumers are idle, then parsing unit 235 repeats step 450. In some embodiments of the present invention, parsing unit 235 updates the yield state information for a particular consumer by clearing a global yield flag corresponding to the particular consumer. Steps 450 and 455 may be repeated as needed to update the yield state information.

Figure 4C:
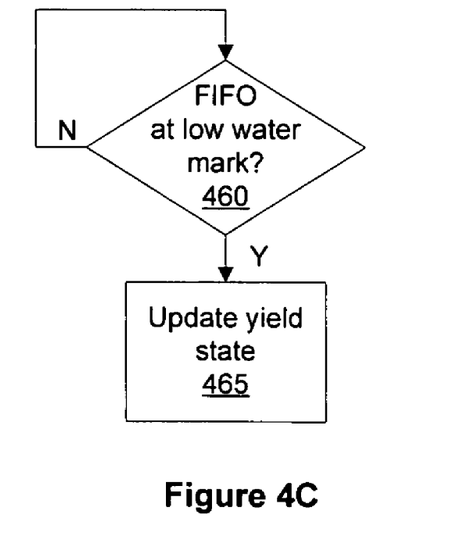

FIG. 4C illustrates an embodiment of another method of updating the yield state information in accordance with one or more aspects of the present invention. In step 460 parsing unit 235 determines if any consumer is indicating that its input FIFO, such as FIFO 260, 262, or 264, has reached a low water mark, i.e. has a specific number of vacancies, and, if so, then in step 465 parsing unit updates the yield state information corresponding to the consumer(s) to indicate that the consumer(s) are no longer yielding. If, in step 450 parsing unit 235 determines that no consumer is indicating that its input FIFO has reached a low water mark, then parsing unit 235 repeats step 460. Steps 460 and 465 may be repeated as needed to update the yield state information.

Figure 5:
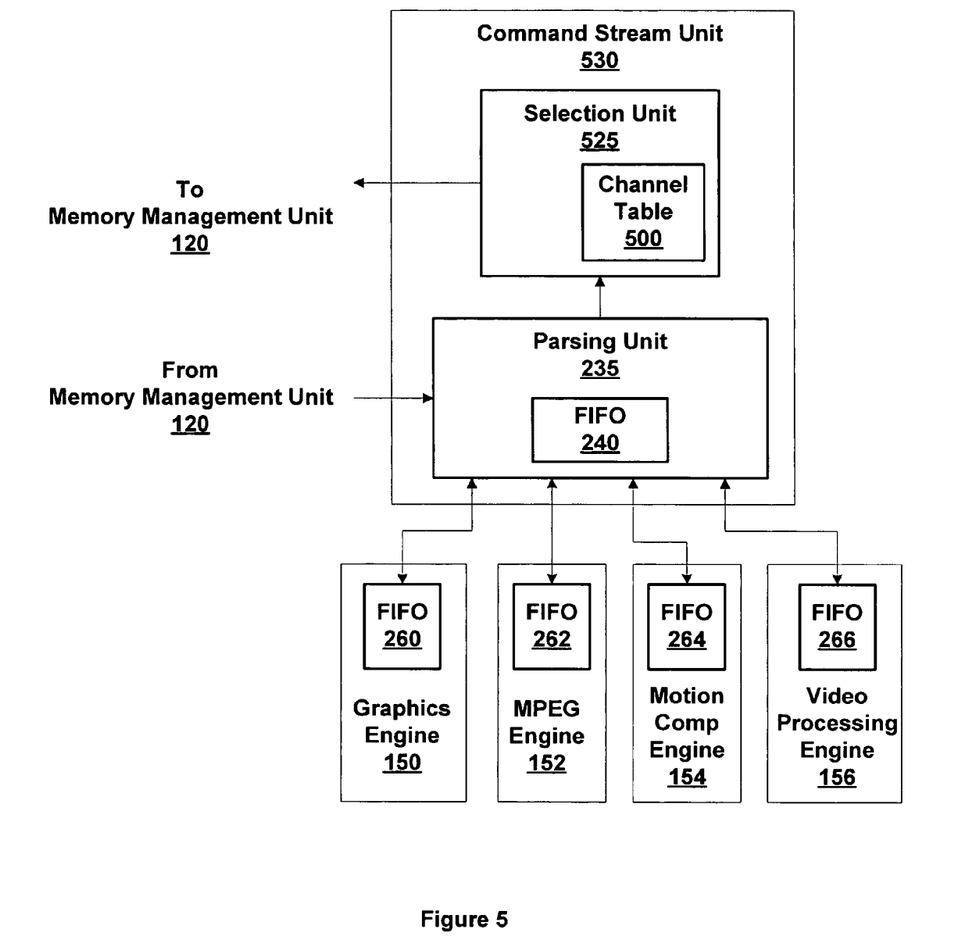
FIG. 5 is another block diagram of a portion of the graphics processor shown in FIG. 1 in accordance with one or more aspects of the present invention.

FIG. 5 is another block diagram of a portion of the graphics processor shown in FIG. 1 in accordance with one or more aspects of the present invention. Like command stream unit 130 shown in FIG. 2B, command stream unit 530 includes parsing unit 235, connections to and from memory management unit 120, and connections to consumers, graphics engine 150, MPEG engine 152, motion comp engine 154, and video processing engine 156. In other embodiments of the present invention, additional consumers, consumers which may be different or the same as graphics engine 150, MPEG engine 152, motion comp engine 154, and video processing engine 156 are coupled to parsing engine 235 and memory management unit 120. In still other embodiments of the present invention, one or more consumers are omitted or replaced with a different type of consumer.

A selection unit 525 includes a channel table 500 which stores channel state information for each channel that is available for processing. The channel state information may include the target consumer type(s) for each channel, processing priority, time slice duration, or the like. Parsing unit 235 provides a selection unit 525 with yield state information which is used in combination with the channel state information to select a channel for processing, as described in conjunction with FIG. 6A.

Figure 6A:
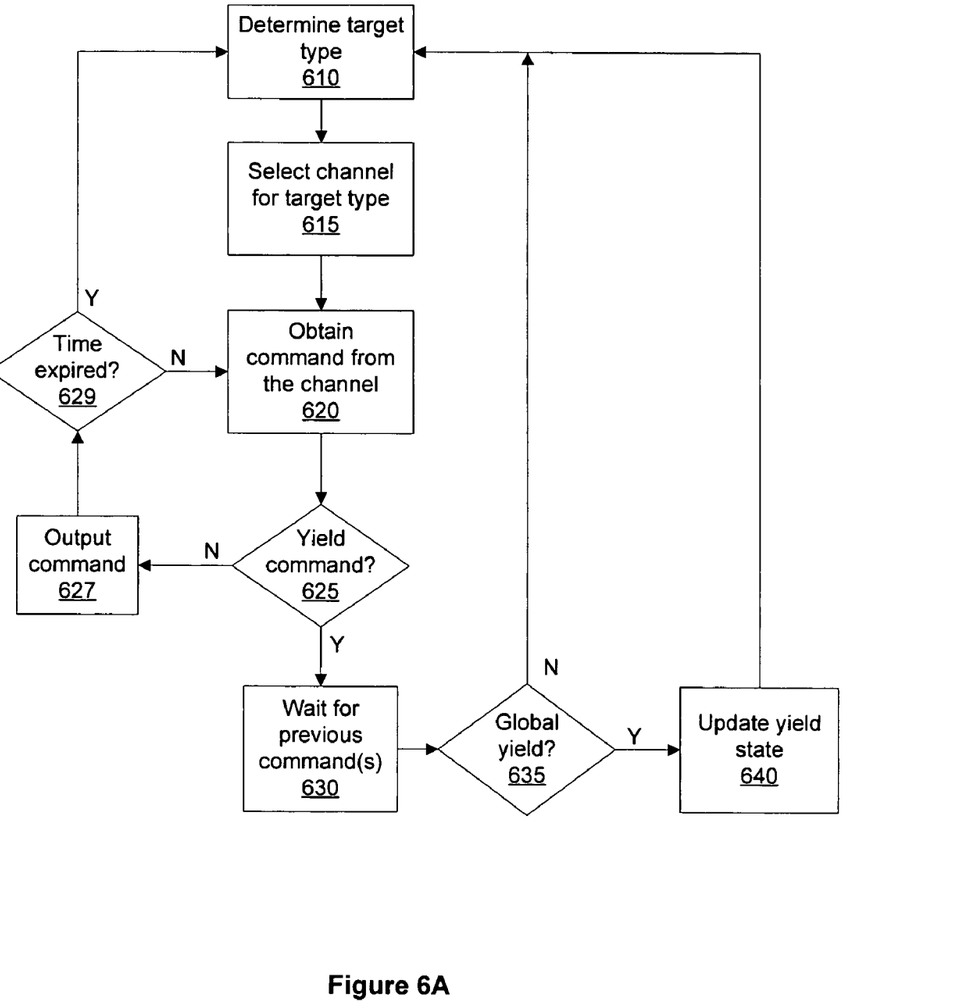
FIG. 6A illustrates another embodiment of a method of cooperatively scheduling commands for multiple consumers in accordance with one or more aspects of the present invention.

FIG. 6A illustrates another embodiment of a method of cooperatively scheduling commands for multiple consumers in accordance with one or more aspects of the present invention. In step 610 selection unit 525 uses the yield state information provided by parsing unit 235 to determine at least one target consumer type. Specifically, selection unit 525 determines the type of consumer(s) if any that are available to accept commands, i.e., the consumer(s) that are not yielding. In step 615 selection unit 525 uses the channel state information stored in channel table 500 and the at least one target consumer type determined in step 610 to select a channel for processing. Specifically, selection unit 525 may be configured to not choose a channel that targets a consumer unless a consumer of that type is not yielding. In step 615, selection unit 525 may select a channel based on other channel state information including processing priority, least recently processed information, time slice duration, a runlist order, or the like. Selection unit 525 reads a group of commands from the selected channel and the group of commands is returned to parsing unit 235 via memory management unit 120.

In step 620 parsing unit 235 obtains a command from the group of commands. Steps 625, 627, 629, 630, 635, and 640 correspond to steps 430, 432, 450, 435, 440, and 445 of FIG. 4A, respectively and are completed as previously described. Following completion of steps 629, 635, and/or step 640, selection unit 525 proceeds to step 610 and determines another target consumer type for processing.

Figure 6B:
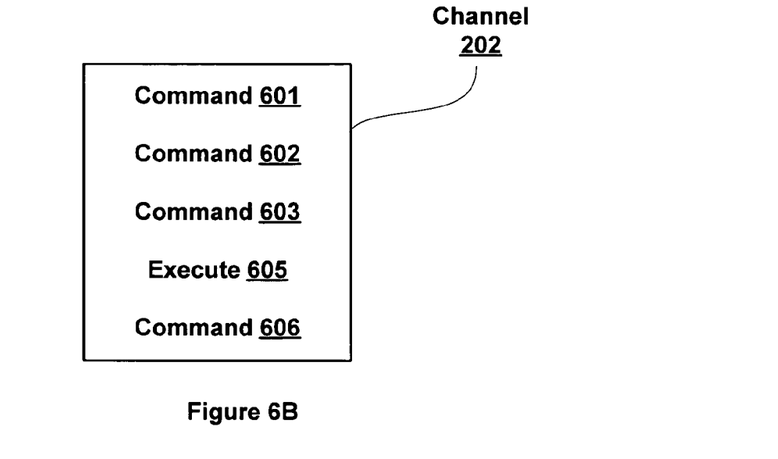
FIG. 6B is a conceptual diagram of commands within another channel in accordance with one or more aspects of the present invention.

FIG. 6B is a conceptual diagram of commands within another channel, channel 202 from FIG. 2A, in accordance with one or more aspects of the present invention. Unlike channel 201, channel 202 does not include a yield command that has been inserted by driver 113. Commands 601, 602, 603, and 606 include configuration information for a specific consumer. An execute command, such as execute 605 initiates processing of data by the specific consumer. Rather than being inserted by driver 113, yield commands may be effectively inserted by parsing unit 235 based on characteristics of the specific consumer. Characteristics similar to those used by driver 113, as described in conjunction with FIG. 3B, may be used to determine whether or not a yield commands should be inserted in the command stream.

Figure 6C:
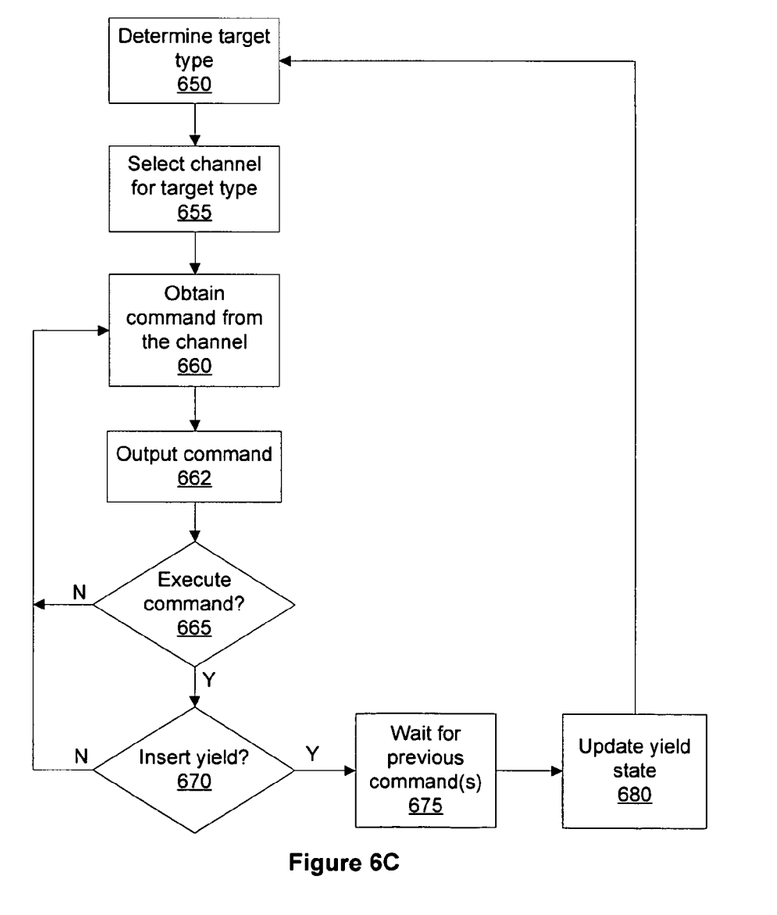
FIG. 6C illustrates yet another embodiment of a method of cooperatively scheduling commands for multiple consumers in accordance with one or more aspects of the present invention.

FIG. 6C illustrates yet another embodiment of a method of cooperatively scheduling commands for multiple consumers in accordance with one or more aspects of the present invention. Steps 650, 655, and 660 correspond to steps 610, 615, and 620 of FIG. 6A, respectively, and are completed as previously described. In step 662 parsing unit 235 expands and queues the command obtained in step 660 for output, for example, by pushing it into FIFO 240. FIG. 6C does not include a step checking if the time slice allocated to the channel has expired, a step corresponding to step 629 from FIG. 6A. However, such a step may be included between steps 662 and 665, in some embodiments of the present invention. In step 665, parsing unit 235 determines if the command obtained in step 660 is an execute command, and if not, parsing unit 235 returns to step 660 to obtain the next command from the channel.

If, in step 665 parsing unit 235 determines the command that was obtained in step 660 is an execute command, then in step 670 parsing unit 235 determines if a yield command should be effectively inserted in the channel following the execute command. Parsing unit 235 may be configured to effectively insert a yield command based on specific characteristics of the target consumer, using similar criteria as is used by driver 113 to insert yield commands to such that the target consumer receives commands representing a sufficient workload. For example, when the target consumer is MPEG engine 152 parsing unit 235 may insert a yield command after two execute commands have been received from a channel. Alternatively, parsing unit 235 may insert a yield command when a target consumer input FIFO, such as FIFO 260, 262, or 264, reaches a high water mark.

If, in step 670 parsing unit 235 determines a yield command should not be inserted, then parsing unit 235 returns to step 660 and obtains the next command in the channel. If, in step 670 parsing unit 235 determines a yield command should be inserted, then in step 675 parsing unit 235 waits for any previous command(s) to be output to the target consumer, as described in conjunction with step 435. Parsing unit 235 does not explicitly insert a yield command in the channel, however, a yield command is effectively inserted and processed by parsing unit 235. Step 680 corresponds to step 445 and is completed as previously described.

Figure 7A:
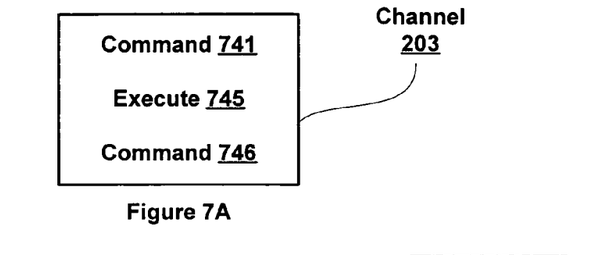
FIG. 7A is a conceptual diagram of commands within a multi-consumer channel in accordance with one or more aspects of the present invention.

FIG. 7A is a conceptual diagram of commands within a multi-consumer channel, channel 203 from FIG. 2A, in accordance with one or more aspects of the present invention. A multi-consumer channel may include yield commands inserted by driver 113 or yield commands may be effectively inserted by parsing unit 235, as previously described. Command 741 targets a first consumer and includes configuration information for the first consumer. An execute command, such as execute 745 initiates processing of the data by the specific consumer. Command 746 targets a second consumer that is different from the first consumer and command 746 includes configuration information for the second consumer.

Although a command stream such as multi-consumer channel 203 may target multiple consumers, only one of the multiple consumers may process commands at a time in order to maintain data coherence and avoid read before write conflicts. However, as is the case with single consumer channels, multi-consumer channels may be processed concurrently with other multi-consumer channels or single consumer channels. Multi-consumer channels may also be processed by two or more consumers concurrently when it is not necessary to maintain data coherence. Scheduling command stream processing using the yield mechanism may improve processing concurrency by providing each consumer with a sufficient workload, increasing command stream throughput.

Figure 7B:
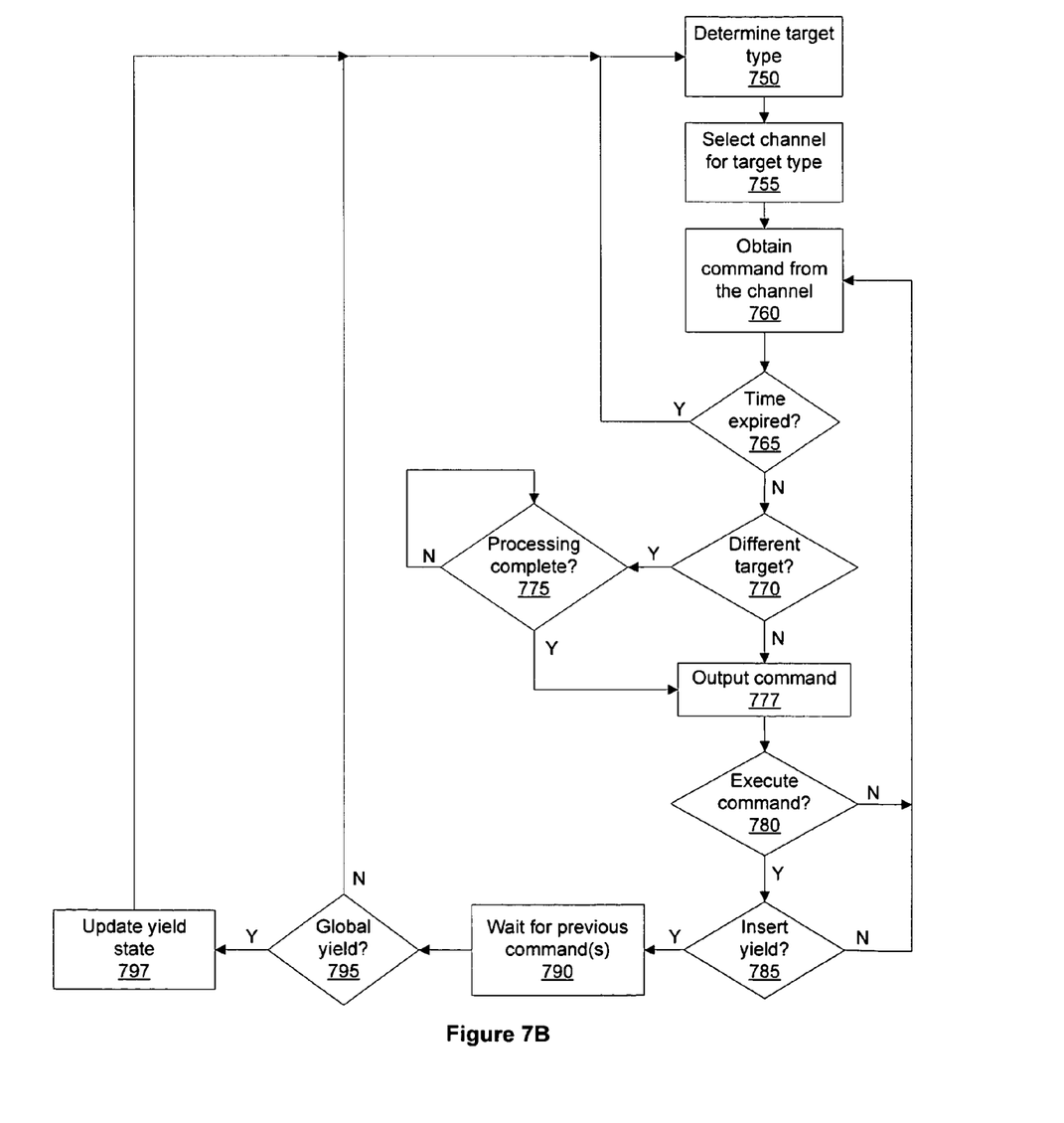
FIG. 7B illustrates an embodiment of a method of cooperatively scheduling commands for multi-consumer channels in accordance with one or more aspects of the present invention.

FIG. 7B illustrates an embodiment of a method of scheduling commands from a multi-consumer channel in accordance with one or more aspects of the present invention. Steps 750, 755, and 760 correspond to steps 610, 615, and 620 of FIG. 6A, respectively, and are completed as previously described. In step 765, parsing unit 235 determines if the time slice allocated to process the channel selected in step 755 has expired. If, in step 765, parsing unit 235 determines the time slice has expired, then parsing unit 235 does not process the command and selection unit 225 selects a different channel in step 750. If, in step 765, parsing unit 235 determines the time slice has not expired, then in step 770 parsing unit 235 determines if the target type for command obtained in step 760 is different from the target type of the last command that was output for the channel. For example, processing channel 203, parsing unit 235 first outputs expanded commands for command 741 and execute 745 which each correspond to a first target type. Parsing unit 235 then obtains command 756 and determines, in step 760, that command 756 is a second target type that is different than the target type of the last command, execute 745, that was output for channel 203. In order to maintain data coherency all of the commands for the first target type should be processed before any commands of the second target type are processed.

If, in step 770, parsing unit 235 determines the target type for the command obtained in step 760 is not different, then parsing unit 235 proceeds to step 777. If, in step 770, parsing unit 235 determines the target type for command obtained in step 760 is different, then in step 775 parsing unit 235 determines if the consumer processing the last command has completed processing of the last command, and if not, then parsing unit 235 repeats step 775. If, in step 776 parsing unit 235 determines the consumer processing the last command has completed processing of the last command, then parsing unit 235 proceeds to step 777.

In step 777 parsing unit 235 expands and outputs the command. If parsing unit 235 includes FIFO 240, then in step 432 parsing unit 235 queues the expanded command for output to the target consumer by pushing it onto FIFO 240.

In step 780, parsing unit 235 determines if the command obtained in step 760 is an execute command, and if not, parsing unit 235 returns to step 760 to obtain the next command from the channel. If, in step 780 parsing unit 235 determines the command that was obtained in step 760 is an execute command, then in step 785 parsing unit 235 determines if a yield command should be effectively inserted in the channel following the execute command. Steps 790, 795, and 797 correspond to steps 435, 440, and 445 of FIG. 4A, respectively, and are completed as previously described.

The pre-emptive scheduling mechanism is used so that a first consumer may yield to a second consumer when the first consumer has received a sufficient workload. The pre-emptive scheduling enables several of the consumers to process commands concurrently and may improve overall command stream throughput. The pre-emptive scheduling mechanism may be implemented by a device driver inserting yield commands into the command stream or by command stream unit 130 or 530 inferring yield commands while parsing the command stream. The command stream unit may also maintain yield state information for each of the consumers indicating which consumers are available to receive commands. The yield state information may be used to select a channel for processing, thereby improving overall command stream throughput.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method for managing the processing of a plurality of command streams, wherein each command stream in the plurality of command streams includes a sequence of commands that configure a different one of a plurality of consumers to perform specific operations associated with the command stream, the method comprising:

allocating a time slice to each of the plurality of consumers for receiving one or more commands associated with one or more of the command streams;

determining a first consumer configured to process commands included in a first command stream;

identifying an execution command included in the first command stream;

determining that a yield command should be inserted into the first command stream based on pre-configured characteristics associated with the first consumer that indicate a number of clock cycles needed to process the execution command;

inserting the yield command into the first command stream after the execution command;

causing the first command stream to be parsed into one or more commands transmitted to the first consumer;

causing the parsing of the first command stream to be stopped based on the yield command;

causing a second command stream to be parsed into one or more commands transmitted to a second consumer based on the yield command; and yielding any remaining time in a first time slice assigned to the first consumer to the second consumer.

2. The method of claim 1, further comprising the step of selecting the second command stream based on the availability of the second consumer to accept and process commands.

3. The method of claim 1, further comprising the step of updating yield state information corresponding to the first consumer indicating that commands should not be output to the first consumer.

4. The method of claim 3, further comprising the step of updating the yield state information corresponding to the first consumer to indicate commands may be output to the first consumer.

5. The method of claim 4, wherein the yield state information is updated when the first consumer completes processing of the commands output to the first consumer and becomes idle.

6. The method of claim 4, wherein the yield state information is updated when the number of commands output to and buffered for processing within the first consumer falls below a predetermined number.

7. A system for switching between multiple command stream channels, comprising:
- a first consumer configured to process commands of at least a first type;
- a second consumer configured to process commands of at least a second type;
- a command stream selection unit configured to:
  - select a first channel, from the multiple command stream channels, based on channel state information and yield state information corresponding to the first consumer and the second consumer, for processing and output of one or more commands to the first consumer; and
  - switch from processing the first channel to processing a second channel for output of one or more commands to the second consumer when a yield command is identified in the first channel, wherein the second channel is also selected from the multiple command stream channels; and
- a parsing unit for determining whether a consumer matching the type of command is available and not yielding to another consumer.

8. The system of claim 7, wherein the command stream unit is configured to maintain the channel state information indicating a command stream type corresponding to each one of the multiple channels.

9. The system of claim 7, further comprising a device driver configured to insert the yield command in the first channel.

10. The system of claim 7, wherein the command stream unit is configured to determine when to switch from processing the first channel to processing the second channel when the first consumer has received a sufficient workload.

11. The system of claim 10, wherein the first consumer indicates the sufficient workload has been received when a predetermined number of commands are buffered for processing by the first consumer.

12. A method of claim 1, including continuing to process commands from the first command stream until all consumers targeted by the first command stream are yielding, and then selecting another command stream for passing to the second consumer.

13. A method of claim 1 including the step of inserting a global yield command in the first command stream to cause the first consumer to yield all further time slices to another consumer until the global yield is terminated.

14. The system of claim 7, wherein the parsing unit includes a FIFO to queue commands for output to consumers, the FIFO being sized to store a plurality of commands for one of the first and second consumers.

15. A system as claimed in claim 7 wherein the global yield is terminated when the consumer is idle and has no commands to execute from the FIFO.

16. A system as claimed in claim 7 including, associating a FIFO with one or more of the consumers each of the consumers continuing to accept commands from the FIFO after a yield command causes pausing of commands for the consumer to stop.

17. The system of claim 7, wherein the parsing unit receives yield commands which are not output to any consumer but cause the pausing unit to direct one of the consumers to yield any remaining time in a time slice for processing a stream of commands to another one of the consumers.

18. A computer-readable medium storing instructions that, when executed by a processor, cause a computing system to manage the processing of a plurality of command streams, wherein each command stream in the plurality of command streams includes a sequence of commands that configure a different one of a plurality of consumers to perform specific operations associated with the command stream, by performing the steps of:
- allocating a time slice to each of the plurality of consumers for receiving one or more commands associated with one or more of the command streams;
- determining a first consumer configured to process commands included in a first command stream;
- identifying an execution command included in the first command stream;
- determining that a yield command should be inserted into the first command stream based on pre-configured characteristics associated with the first consumer that indicate a number of clock cycles needed to process the execution command;
- inserting the yield command into the first command stream after the execution command;
- causing the first command stream to be parsed into one or more commands transmitted to the first consumer;
- causing the parsing of the first command stream to be stopped based on the yield command;
- causing a second command stream to be parsed into one or more commands transmitted to a second consumer based on the yield command; and
- yielding any remaining time in a first time slice assigned to the first consumer to the second consumer.

19. The computer-readable medium of claim 18, further comprising the step of selecting the second command stream based on the availability of the second consumer to accept and process commands.

20. The computer-readable medium of claim 18, further comprising the step of updating yield state information corresponding to the first consumer indicating that commands should not be output to the first consumer.

* * * * *